United States Patent [19]

Hall

[11] Patent Number: 5,189,095

[45] Date of Patent: Feb. 23, 1993

[54] HIGH-IMPACT POLYSTYRENE

[75] Inventor: Richard A. Hall, Naperville, Ill.

[73] Assignee: Amoco Corporation, Chicago, Ill.

[21] Appl. No.: 808,099

[22] Filed: Dec. 16, 1991

[51] Int. Cl.$^5$ .................. C08G 63/91; C08G 51/04; C08G 51/08; C08G 55/02

[52] U.S. Cl. .................. 525/53; 525/54; 525/71; 525/84; 525/86

[58] Field of Search .................. 525/53, 54, 71, 84, 525/86

[56] References Cited

U.S. PATENT DOCUMENTS 4,777,210 10/1988 Sosa et al. .................. 525/53

FOREIGN PATENT DOCUMENTS 4017281 12/1990 Fed. Rep. of Germany .

59-10513 1/1984 Japan .
63-113009 5/1988 Japan .
63-118315 5/1988 Japan .

*Primary Examiner*—Jacob Ziegler
*Attorney, Agent, or Firm*—Rae K. Stuhlmacher; Wallace L. Oliver; Frank J. Sroka

[57] ABSTRACT

A first reactor is used to graft polystyrene to a rubber-like polymer. A second reactor is used to obtain a mixture of styrene and polystyrene. The effluent from both the first and the second reactors are fed into a quiescent reaction zone where phase inversion occurs. The phase inverted material is fed into post inversion reactors to substantially complete the polymerization of the styrene monomer, and any unreacted styrene monomer is driven off to form the improved high-impact polystyrene.

13 Claims, No Drawings

HIGH-IMPACT POLYSTYRENE

FIELD OF THE INVENTION

This invention relates to a process for making an improved rubber-modified, high-impact polystyrene. More specifically, this invention relates to a process wherein the starting materials are treated in separate reactors and phase inversion occurs in a quiescent reaction zone thus forming an improved high-impact polystyrene.

BACKGROUND OF THE INVENTION

High-impact polystyrene is typically a two-phase polymer consisting of rubber-like particles embedded in a polystyrene matrix. Typically, polystyrene is trapped (occluded) in the rubber-like polymer particles.

When the amount of rubber-like polymer employed is held constant, and the amount of the polystyrene occluded (trapped) within the rubber-like polymer particles is increased, the size of the rubber-like polymer particles increases providing a high-impact polystyrene having improved properties. When the amount of rubber-like polymer employed is decreased and the amount of polystyrene occluded within the rubber-like polymer particles is increased, the properties of the high-impact polystyrene remain constant. It is desirable to provide a high-impact polystyrene that has improved properties without increasing the amount of rubber-like polymer needed or a high-impact polystyrene that has equivalent properties using less rubber-like polymer.

It is important to have crazes, initiated by rubber particles, to obtain efficient use of rubber in the toughening of polystyrene. Crazes are microcracks which are formed to relieve stress in a deformed part. When a low number of crazes are initiated it is more likely that one of the crazes will become a large crack and lead to early failure of the deformed part. Rubber phase characteristics (particle size, size distribution, volume, polystyrene occlusions, etc) can affect craze formation and are important in providing reinforcement of the polystyrene matrix in high-impact polystyrene. The volume of the polystyrene occlusions is also important to high-impact polystyrene craze initiation. Crazing is initiated when rubber particles are near the surface of the part under stress. Large polystyrene occlusions are desirable for efficient craze initiation.

In addition, the rubber-like polymer particles must be anchored in the polystyrene matrix. This is accomplished by grafting (anchoring) the polystyrene onto the rubber-like polymer. The resulting graft copolymer resides at the interface between the rubber-like polymer and the polystyrene.

Although some grafting of the rubber-like polymer and polystyrene may occur without the use of a grafting catalyst or initiator, a grafting catalyst or initiator increases the formation of a graft. However, the presence of an initiator can have an adverse effect on the polymerization of the styrene monomer. For example, when a grafting catalyst or initiator, such as peroxide, is used to control grafting the peroxide can react with mercaptans that are typically used in the polymerization process to control the molecular weight of the polystyrene thereby resulting in polymers of undesirable molecular weight. Therefore, it is desirable to provide a process for making high-impact polystyrene where the grafting catalyst does not destroy the molecular weight modifier.

Accordingly, it is important to achieve a balance between the amount of rubber-like polymer, the size and polystyrene content of the occlusions in the rubber-like polymer particles, and the strength of the graft between the dispersed and continuous phase in order to improve the morphology of the high-impact polystyrene.

Japanese Kokai Patent SHO 63-113009 (1988) discloses a process sequence wherein a blending type reactor is used to prepolymerize styrene monomer and a rubber-like polymer forming a prepolymerized solution. The prepolymerized solution is fed into a mixing apparatus containing an agitation device, such as a propeller, where the prepolymerized solution is mixed with a circulating polymer solution. Phase inversion occurs in the mixing device.

In the discussion in Japanese Kokai Patent SHO 63-113009 (1988), Japanese Kokai Patent SHO 59-10513 (1984) is described as disclosing a process for making an impact-resistant polystyrene in which "the first flow from pre-graft treatment is blended with the second flow made up of polymerized styrene solution to granulize the rubber-like substance."

Japanese Kokai Patent SHO 63-118315 (1988) discloses a process wherein a first and second complete mixing-type reaction container are connected in series with a plug flow-type reaction container. Phase inversion occurs in the complete mixing-type reaction containers.

A German reference, DE No. 4,017,281 discloses a process wherein polybutadiene rubber-like polymer and polymerized polystyrene are prepared in completely mix-type reactors and are then fed into a mixer such as an in line-mixer equipped with a stirrer or a reactor of the completely-mixed type.

The present invention differs from the above references in a critical aspect. In the present invention, phase inversion occurs in a quiescent reaction zone. In the above references, phase inversion occurs in a mixing apparatus or a complete mixing-type reaction container. When mixing or stirring is used during phase inversion, the mixing will break or disrupt the rubber-like polymer particles resulting in a particle size distribution that is broad, which is undesirable.

It is a general object of the present invention to provide an improved process for making an improved high-impact polystyrene.

It is an object of the present invention to provide an improved process for making a high-impact polystyrene in which the size of the rubber-like polymer particles is relatively large and relatively evenly distributed, the content of polystyrene occlusions is relatively large, and the rubber-like polymer particles are relatively strongly grafted to the polystyrene.

It is a further object of the present invention to maximize the separation of the process of grafting the rubber-like polymer and the polystyrene from the process of polymerizing the styrene monomer, to thereby separate incompatible feed components and minimize undesirable side reactions.

It is a still further object of the present invention to maximize the use of the rubber-like polymer by reducing the amount of rubber-like polymer used in the particles while, at the same time, not decreasing the morphology of the high-impact polystyrene.

Other objects and advantages of the present invention will become apparent upon reading the following detailed description and appended claims.

SUMMARY OF THE INVENTION

A first reactor is used to graft polystyrene to a rubber-like polymer. A second reactor is used to obtain a mixture of styrene monomer charge and polystyrene. The effluent from both the first and the second reactors is fed into a quiescent reaction zone where phase inversion occurs to form the improved high-impact polystyrene. The polystyrene to rubber-like polymer ratio in the grafter effluent is kept below the point of phase inversion, preferably about 95:100, more preferably 75:100. If the ratio goes too high, for example 1:1, the phase inversion will occur in the grafter and morphology properties will be lost. On the other hand, if the ratio is too low, morphology properties will not be established.

In greater detail, a first sytrene monomer charge and a rubber-like polymer are introduced into a first reactor (grafter). A portion of the first styrene monomer is polymerized and grafted to the rubber-like polymer to form a dispersed phase of a first polystyrene in a continuous phase of rubber-like polymer. The weight ratio of the styrene monomer charge to rubber-like polymer is from about 85:15 to about 98:2. Preferably, the weight ratio of styrene monomer to rubber-like polymer is from about 89:11 to about 95:5.

A second styrene monomer charge is introduced into a second reactor. From about 20 to about 60 weight percent of the total second styrene monomer charge is polymerized to form a second polystyrene in admixture with the remaining unreacted second styrene monomer charge.

The effluents from the first and second reactors are combined in a quiescent reaction zone where phase inversion occurs. After phase inversion, the polystyrene occluded rubber-like polymer is the discrete phase and the polystyrene is the continuous phase. The weight ratio of effluent from the first reactor to the effluent from the second reactor is from about 50:50 to about 90:10. Preferably, the weight ratio of effluent from the first reactor to the effluent from the second reactor is from about 70:30 to about 80:20. The most preferred ratio is 75:25.

In still greater detail, the objects of the invention are achieved by a process for making a high-impact polystyrene, comprising:

(a) introducing into a first reactor a first styrene monomer charge and a rubber-like polymer and prepolymerizing therein a sufficient amount of the first styrene monomer charge to thereby form a sufficient amount of a first polystyrene, and contacting therein the resulting sufficient amount of first polystyrene and rubber-like polymer such that a polystyrene-rubber-like graft copolymer is formed;

(b) introducing into a second reactor a second styrene monomer charge and polymerizing therein from about 20 to about 60 weight percent of the second styrene monomer charge to form a second polystyrene in admixture with the remaining unreacted second styrene monomer charge;

(c) phase inverting the polystyrene-rubber-like graft copolymer by combining the effluents from the first reactor and the second reactor in a quiescent reaction zone; and (d) completing the polymerization of the remaining unreacted first and second styrene monomer charges in a polymerization reactor to form the the high-impact polystyrene.

The quiescent reaction zone provides rubber-like polymer particles that have an increased volume and an increased amount of polystyrene in the form of occlusions. Therefore, the process of the present invention is able to provide an improved high-impact polystyrene polymer.

In another embodiment of the process of the present invention, because the grafting and polymerization steps are carried out in separate reactors, incompatible components can be used in the separate grafting and polymerization steps. For example, certain ingredients in the high-impact polystyrene formulation are incompatible. One example is the catalyst or initiator that is used to control the grafting process. Where peroxide is used to control the grafting, the peroxide can react with mercaptans that are typically used to control the molecular weight of the polystyrene. In the process of the present invention, the peroxide is placed in the first reactor (grafter) and kept separate from the mercaptans that are typically found in the second reactor (polymerizer). By the time the effluent from the first and second reactor are combined in the quiescent reaction zone, most of the peroxide initiator will have reacted to increase the graft copolymer level in the high-impact polystyrene.

BRIEF DESCRIPTION OF THE INVENTION

Briefly, the first reactor effluent is a two-phase solution of polystyrene and rubber-like polymer. The second reactor supplies enough polystyrene to the quiescent reaction zone to phase-invert the effluent from the first reactor. Before phase inversion, the rubber-like polymer in styrene phase is the major or continuous phase and the polystyrene is the discrete phase. As more polystyrene is added, a phase inversion occurs. After phase inversion, the polystyrene phase is the continuous phase and the rubber-like polymer in styrene is the discrete phase. The polystyrene-grafted rubber-like polymer particles are dispersed into roughly spherical particles which act to reinforce an otherwise brittle polystyrene matrix.

The reactor feed may be fed into the reactors from one or more points to aid in control of temperatures in the reactors. The temperature is typically maintained in the range of from about 90° C. to about 130° C. In addition, the reaction mass is typically stirred as it moves through the grafter and polymerizer reactors to establish a substantially uniform temperature throughout the mass.

Styrene monomers that are suitable for use in the process of the present invention include styrene, alpha-methylstyrene, p-methylstyrene, chlorostyrene, mixtures thereof, or derivatives thereof including styrene monomers containing a copolymerizable monomer as a substituent, such as acrylonitrile, maleic anhydride, methyl methacrylate, vinyl acetate or divinylbenzene, and the like.

Rubber-like polymers that are suitable for use in the process of the present invention include natural rubber, styrene-butadiene-rubber, polybutadiene, polyisoprene, nitrile rubbers, and elastomeric block copolymers of a 1,3-conjugated diene and a styrene monomer, and the like. Preferably the rubber-like polymer is polybutadiene, styrene-butadiene rubber or polyisoprene. In addition, the polybutadiene rubbers can include polybutadiene (PBD) and styrene-butadiene (SBR) rubbers. Typically, useful PBD rubbers are linear and branched polymers of butadiene containing from 25 to 99 percent cis content with less than 20 percent free vinyl unsaturation (i.e., 1,2-addition). A commonly used PBD would contain about 35 percent cis and about 14 percent free vinyl unsaturation. Solution viscosities for useful PBDs range from 25 to 220 centipoise and preferably range from 70 to 190 centipoise measured at a concentration of 5 percent by weight in styrene at 30° C. Useful SBR rubbers are random or block copolymers of butadiene and styrene, or combinations thereof, with 5 to 50 percent bound styrene. Typical solution viscosities are 20 to 190 centipoise and typical Mooney viscosities are 30 to 120. These rubbers can be present in styrene polymers at levels from about 2 to 20 percent and typically from about 3 to 10 percent.

The resulting improved high-impact polystyrene produced by the process of this invention contains preferably from about 2 to about 15, more preferably from about 5 to about 9, parts of the rubber-like polymer per part by weight of polystyrene.

In the process of the present invention a first styrene monomer charge and a rubber-like polymer are introduced into a first reactor (grafter) at a styrene monomer charge to rubber-like polymer in a ratio of from about 85:15 to about 98:2. The styrene monomer charge is prepolymerized and the resulting prepolymer and rubber-like polymer are contacted such that the rubber-like polymer forms a continuous phase to which the prepolymer is grafted as a dispersed phase. Preferably, the styrene monomer charge is prepolymerized in the first reactor to produce a weight ratio of polystyrene to rubber-like polymer of about 75:100.

A second styrene monomer charge is separately introduced into a second reactor (polymerizer) and prepolymerized to a substantially greater extent than is the first styrene monomer charge that is introduced into the first reactor. In general, from about 20 to about 60 weight percent of the styrene monomer charge undergoes polymerization in the second reactor. However, at least a sufficient amount of the second styrene monomer charge must be prepolymerized to a second styrene polymer so that when the reaction effluents of the first and second reactors are combined phase inversion occurs.

Generally, from about 50:50 to about 90:10 parts of the effluent from the first reactor compared to the effluent from the second reactor are combined in the quiescent reaction zone.

The quiescent reaction zone is an essentially motionless zone having no moving parts, such as, for example, a propeller, wherein phase inversion takes place. The preferred quiescent reaction zone used in the process of the present invention is an essentially motionless mixer inverter. Such inverters are commercial products and are readily available, for example, KOCH ® model SMX. This motionless mixer inverter uses mixing elements in tubes making about four divisions per element which is accompanied by a pressure drop and an increase in shear stress. The size and number of the tubes as well as the number of elements will vary with the scale of the process.

In order to provide efficient reinforcement of the polystyrene with the rubber-like polymer, the rubber-like polymer particles should be sufficiently anchored in the polystyrene matrix. This is accomplished by grafting of polystyrene onto rubber-like polymer in the high impact polystyrene synthesis. The graft copolymer resides at the interface between rubber-like polymer and polystyrene. While grafting occurs without the use of catalysts or initiators, these catalysts or initiators, for example, peroxide, increase the amount of graft copolymer that anchors the rubber-like polymer particles in the high impact polystyrene.

The selection of an appropriate catalyst or initiator depends on the anticipated reaction conditions and initiator type. The initiator must be a "grafting" catalyst or initiator. Azo-initiators like azo-bis-isobutryo nitrile tend to be inefficient in the grafting process. In general, all peroxide initiators are capable of grafting polystyrene onto the rubber-like polymer backbone. However, the initiator must be reactive at the temperature of the reaction medium. Peroxide initiators reactive at 90° C. to 120° C. are reasonable choices for the grafter and there are many initiators to chose from. Suitable initiators include, for example, t-butylperoxy-2-ethylhexanoate (TBPE) and t-butylperbenzoate (TBPB), and the like.

Since grafting catalysts or initiators are reactive components, several other feed components can react with the initiators to compete with the grafting reaction. The process of the present invention uses two reactors that allow for the separation of incompatible feed components. Other substances which should be kept separate from the initiator include chaintransfer agents, recycle condensate, antioxidants, and the mercaptans typically used for polystyrene molecular weight control.

The process of the present invention can be practiced with or without using an initiator and recirculation is not required.

The separate steps also afford the ability to filter any unwanted gels that may form in the rubber-styrene feed solution by using a fine filter. Currently a fine filter cannot be used because components, such as zinc stearate (another common feed component), can plug a fine filter. In the process of the present invention, zinc stearate can be added in the styrene stream to the polymerizer and later removed with a fine filter.

In addition to the styrene monomer and rubber-like polymer, up to 10 wt. % of the total polymerization feedstock can be other materials, such as stabilizers, antioxidants, colorants, flame retardants, lubricants, and the like.

The following examples will serve to illustrate certain embodiments of the herein disclosed invention. These examples should not, however, be construed as limiting the scope of the invention as there are many variations which may be made thereon without departing from the spirit of the disclosed invention, as those of skill in the art will recognize.

EXAMPLE 1

A solution of 30 wt. % polystyrene in styrene was added to a grafter effluent containing 4.5 wt. % polystyrene and about 6.0 wt. % polybutadiene. The ratio of the polystyrene solution to occluder effluent was 1:3 by weight. The combination was mixed very gently with a spatula to simulate the action of a quiescent reaction zone. A small amount of the mixture was transferred to a microscope slide and the rubber-like polymer phase morphology was characterized qualitatively.

Well defined rubber-like polymer particles had formed. The rubber-like polymer particles were observed to contain large polystyrene occlusions.

EXAMPLES 2-10

2500 ml stainless-steel kettles were used as the grafter and polymerizer. A liquid feed (rubber and occasionally other ingredients dissolved in styrene in the case of the grafter and styrene in the case of the polymerizer) was introduced into each reactor through a valve at the bottom of each vessel. Polymerization in each vessel was controlled using external heaters and cooling coils. A computer control system was employed to vary the temperature of the heaters and to regulate the flow of coolant through the cooling coils to maintain the desired polymerization temperatures in the grafter and polymerizer vessels. The reactors were fitted with internal agitators, rotated during the polymerization to maintain heat transfer in and out of the reaction medium and to disperse the polystyrene phase in the rubber phase in the case of the grafter. Effluent from each liquid-full vessel was discharged from the top and transferred to the quiescent reaction zone. A KOCH motionless mixer was employed as a quiescent reaction zone, to combine the grafter and polymerizer effluents and achieve phase inversion. The mixing elements were ½ inch tubes making about four (4) divisions per element. Three five-element sections were used.

Polymerizer feed was introduced at 257 g/hr and the polymerizer temperature was controlled at a temperature to give 35 wt. % polymerizer conversion (typically 105° C.). At the same time, feed was started to give about 6 wt. % conversion in the grafter. The feed from both vessels was polymerized to obtain the desired conversion prior to continuous operation. After the system stabilized, the unit was run for about eight additional hours before the material was collected and saved in the cold room for morphology inspection and batch finishing.

Some difficulty was encountered in pumping solutions of high rubber-like polymer level (10%) to the grafter. The throughput rate had to be reduced in continuous runs at high rubber-like polymer levels. To obtain experimental data comparable to runs made at lower rubber-like polymer level, the grafter feed was polymerized batch-wise and then pumped through the quiescent reaction zone where the grafter effluent was combined with polymerizer effluent.

The grafter was polymerized in the batch mode until the desired conversion was reached. At the same time, the polymerizer was run in continuous mode — maintaining the conversion at 35%. The grafter was cooled below 100° C. and pumped from the bottom at 773 g/hr and mixed in the inverter with the polymerizer effluent flowing at 257 g/hr. This simulated continuous operation at a total throughput rate of approximately 1030 g/hr. This is the product that was examined for morphology. The morphology is reported in Table II.

The phase inverted effluent from the inverter was placed in a 3/8-inch ID Teflon tube and capped on both ends with standard Swagelok fittings using Teflon ferrules. The sealed tubes were transferred to an oil bath that had been preheated to 127° C. and preprogrammed to run a cycle of 127° C. for 2 hr, 170° C. for 10 hr, and 210° C. for 2 hr, with 30 min linear ramps between plateaus. The cycle gave greater than 99 wt. % converted resin.

The reaction conditions for Examples 2-10 are reported in Table I.

TABLE I

| Example Numbers | PBD* (%) Grafter Feed | PBD (%) Inverter Feed | TBPB** ppm |
| --- | --- | --- | --- |
| 2 | 8.0 | 6.0 | 0 |
| 6 | 10.0 | 7.5 | 0 |
| 8 | 10.0 | 7.5 | 0 |
| 3 | 8.0 | 6.0 | 300 |
| 4 | 10.0 | 7.5 | 300 |
| 10 | 10.0 | 7.5 | 300 |

*polybutadiene
**t-butylperbenzoate

The desired morphology of the grafter effluent was small tightly-packed discrete droplets of polystyrene in a styrene-rubber-like polymer solution. This morphology was achieved when the amount of polystyrene in the grafter was about 0.75 of the amount of rubber-like polymer in the vessel.

Grafter and inverter effluents were examined using a phase-contrast microscope. Slides were prepared by spotting a small amount of prepolymer on a microscope slide. A coverslip was placed gently on the polymer. The observed morphology is reported in Table II.

Some run conditions produced a minor amount of stringy material in the inverter effluent. A numbering system was developed to classify samples according to the amount of stringy material, as seen through the microscope. A value of one was assigned, in a range from 1-10, to a sample containing no stringy material. A value of 10 indicated a sample that was phase inverted, but mostly in the form of strings. A similar system was devised to describe the amount of occluded polystyrene in the rubber-like polymer particles. A value of 1 was used to describe a rubber-like polymer phase consisting of rubber-like polymer particles containing large, tightly-packed polystyrene occlusions. This is the excellent rubber-like polymer-phase morphology desired. A rubber-like polymer phase consisting of rubber-like polymer particles containing no polystyrene occlusions would be assigned a value of 10.

The number of indicator particles seen in a microscope 1,000X field is reported in Table II, below, as the indicator particles per field. An indicator particle is a rubber-like polymer particle containing a large polystyrene occlusion, at least one-half the diameter of the rubber-like polymer particle.

TABLE II

| Example Number | Total Feed Rate (g/hr) | Grafter Rubber Level (%) | Ethylbenzene Level (%) | Initiator TBPB* (ppm) | Polymerizer Polymerization Temp (°C.) |
| --- | --- | --- | --- | --- | --- |
| 2 | 1030 | 8.0 | 2 | 0 | 114 |
| 3 | 1030 | 8.0 | 2 | 300 | 111 |
| 4 | 1030 | 8.0 | 2 | 300 | 115 |
| 5 | 800 | 10.0 | 5 | 0 | 104 |
| 6 | 1030 | 10.0 | 5 | 0 | 109 |
| 7 | 1030 | 10.0 | 2 | 0 | 111 |
| 8 | 1030 | 10.0 | 2 | 0 | 107 |
| 9 | 770 | 10.0 | 2 | 300 | 108 |
| 10 | 1030 | 10.0 | 2 | 300 | 106 |

*TBPE is t-butylperbenzoate.
Koch Inverter Mixer (15 Mixing Elements)
Grafter/Polymerizer Feed Split 75/25

TABLE II (Cont'd.)

| Example Number | Grafter Polymerization Temp (°C.) | Polymerizer Conversion (%) | String Rating (1-10) | Particle Filling Rating (1-10) | Indicator Particles per Field |
|---|---|---|---|---|---|
| 2 | 106 | 48.7 | 3 | 1 | >20 |
| 3 | 96 | 43.9 | 3 | 3 | 3 |
| 4 | 96 | 50.5 | 3 | 3 | 3 |
| 5 | 96 | 33.6 | 4 | 1 | 15 |
| 6 | — | 36.0 | 4 | 1 | 8 |
| 7 | — | 37.6 | 6 | 5 | 1 |
| 8 | 95 | 33.8 | 4 | 3 | 3 |
| 9 | 96 | 40.0 | 5 | 3 | 4 |
| 10 | — | 37.1 | 4 | 4 | 1 |

Koch Inverter Mixer (15 Mixing Elements)
Grafter/Polymerizer Feed Split 75/25

Indicator particles are present when the system is functioning properly. As can be seen in Table II, the system was found to work better at lower levels, but satisfactory results were found at from 6-10 wt. % rubber-like polymer in the grafter feed. In addition, the string ratings were low with, or without, an initiator. Particle filling was found to contain large tightly packed polystyrene occlusions.

EXAMPLES 11-18

Jacketed, carbon-steel kettles were used as the grafter and polymerizer. The liquid feeds (rubber and occasionally other ingredients dissolved in styrene in the case of the grafter and styrene and occasionally other ingredients in the case of the polymerizer) were introduced continuously into each reactor through a valve at the top of each vessel. Polymerization in each vessel was controlled by circulating heat-transfer oil through the vessel jackets. A control system was employed to vary the temperature of the heat-transfer oil to maintain the desired polymerization temperatures in the grafter and polymerizer vessels. The reactors were fitted with internal agitators, rotated during the polymerization to maintain heat transfer in and out of the reaction and to disperse the polystyrene phase in the rubber phase in the case of the grafter. A level-control system was used to maintain the liquid level in each reactor. Effluent from each vessel was discharged continuously from the bottom and transferred to the quiescent reaction zone where phase inversion occured.

The quiescent reaction zone (inverter) was in three sections each containing 15 KOCH SMX elements. The elements were in ¾ inch tubes.

Jacketed, carbon-steel kettles were used in reactors A and B. Effluent from the quiescent reaction zone was transferred to the inlet of vessel A and then was transferred to the inlet to vessel B at the top of vessel B. Polymerization in each vessel was controlled by circulating heat-transfer oil through the vessel jackets. A control system was employed to vary the temperature of the heat-transfer oil to maintain the desired polymerization temperatures in vessels A and B. The reactors were fitted with internal agitators, rotated during the polymerization to maintain heat transfer in and out of the reaction, but not to the extent that it would alter the rubber particles formed in the quiescent reaction zone. A level-control system was used to maintain the liquid level in each reactor. Effluent from vessel B, discharged from the bottom, was transferred to a finishing section for heating the polymer stream to a temperature suitable for removal of unreacted styrene monomer in a devolatilizer followed by stranding and pelletization. This is the sample that was examined for morphology as reported in Table IV.

Examples 11-18 were prepared under the variable conditions reported in Table III. Constant reaction conditions were:

1. The feed rate of the grafter divided by the polymerizer feed rate (split) was 3/1.
2. The polymerizer was run at an agitation rate of approximately 20 rpm.
3. The grafter was run at an agitation rate of approximately 500 rpm.
4. The polystyrene to polybutadiene ratio in the grafter was 75:100.
5. The number of sections in the essentially motionless inverter quiescent reaction zone was 3.
6. The temperature in the grafter was held at approximately 117°-119° C.

Additional reaction conditions are reported in Table III.

TABLE III

| Ex. No. | Styrene Conv. Rate (%)[1] | Mercaptan (ppm) | Ratio PS/PBD[2] | Init[3] (ppm) | Polymerizer Temp. (°C.) | Reactor A[4] (rpm) | Reactor B[4] (rpm) |
|---|---|---|---|---|---|---|---|
| 11 | 25 | 0 | 0.75 | 0 | 235 | 20 | 15 |
| 12 | 33 | 0 | 0.75 | 0 | 241 | 20 | 15 |
| 13 | 40 | 0 | 0.75 | 0 | 250 | 20 | 15 |
| 14 | 35 | 200 | 0.75 | 0 | 243 | 20 | 15 |
| 15 | 35 | 800 | 0.75 | 0 | 243 | 20 | 15 |
| 16 | 35 | 800 | 0.75 | 0 | 243 | 15 | 10 |
| 17 | 35 | 800 | 0.75 | 0 | 243 | 10 | 10 |
| 18 | 40 | 800 | 0.75 | 300 | 250 | 15 | 15 |

[1]The polymerization conversion rate is reported as percent styrene monomer that is converted to polystyrene in the polymerizer.
[2]The ratio of polystyrene (PS) to polybutadiene (PBD) in the grafter.
[3]The initiator was t-butyl perbenzoate.
[4]Reactors A and B are post-inversion reactors that were used to complete the conversion of styrene monomer to polystyrene.

Unreacted styrene monomer was removed using vacuum devolatilization. The molten polymer was stranded and chopped into pellets. Reactor A effluents from Examples 11-18 were examined visually. The resulting morphology observations are reported in Table IV.

TABLE IV

| Example Number | Morphology Observations |
|---|---|
| 11 | * |
| 12 | Very Good fill to Excellent fill, >10 indicators, no strings |
| 13 | Very Good fill to Excellent fill, >10 indicators, no strings |
| 14 | Very Good fill, >10 indicators, no strings |
| 15 | Excellent fill, >>10 indicators, no strings |
| 16 | Excellent fill, >>10 indicators, no strings |
| 17 | Excellent fill, 10 indicators |
| 18 | Very Good fill, 2-6 indicators, some large particles |
| A | Good fill, 4-5 indicator particles, a few strings |

*The Polymerization conversion rate was low and this sample was not run through Reactor A as the conversion rate was increased the results improved.

COMPARATIVE EXAMPLE A

A comparative example was run through reactors A and B (under conditions described in Examples 11-18). In other words, there was no grafter, no polymerizer, and no quiescent reaction zone.

Example 18 was not compared with Comparative Example A because Example 18 included an initiator where Comparative Example A did not include an initiator.

There was a sharp contrast between Comparative Example A and Examples 1-17. Generally, the fill was much better in Examples 1-17. In addition, as can be seen in Table IV, Examples 1-17 had considerable more indicators and no strings.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

What is claimed is:

1. A process for making a high-impact polystyrene, comprising:
   (a) introducing into a first reactor a first styrene monomer charge and a rubber polymer and prepolymerizing therein a sufficient amount of the first styrene monomer charge to form a first polystyrene, and contacting therein the resulting first polystyrene and rubber polymer such that a polystyrene-rubber graft copolymer is formed;
   (b) introducing into a second reactor a second styrene monomer charge and polymerizing therein from about 20 to about 60 weight percent of the second styrene monomer charge to form a second polystyrene in admixture with the remaining unreacted second styrene monomer charge;
   (c) phase inverting the polystyrene-rubber graft copolymer by combining the effluents from the first reactor and the second reactor in a quiescent reaction zone; and
   (d) completing the polymerization of the remaining unreacted first and second styrene monomer charges in a polymerization reactor to form high-impact polystyrene.

2. The process of claim 1 wherein the first and second styrene monomer charges are independently selected from the group consisting of styrene, 2-methylstyrene, p-methylstyrene, chlorostyrene, and derivatives thereof.

3. The process of claim 1 wherein the rubber polymer is selected from the group consisting of natural rubber, styrene-butadiene rubber, polybutadiene, polyisoprene, a nitrile rubber, and a copolymer of a 1,3-conjugated diene and a styrene monomer.

4. The process of claim 1 wherein the monomer charges in step (a) and in step (b) are styrene.

5. The process of claim 1 wherein the quiescent reaction zone is an essentially motionless inverter.

6. The process of claim 1 wherein a weight ratio of first styrene monomer charge to rubber polymer in the first reactor is from about 85:15 to about 98:2.

7. The process of claim 1 wherein a ratio of from about 85:15 to about 98:2 parts of the first styrene monomer charge to rubber polymer is introduced into the first reactor.

8. The process of claim 1 wherein the ratio of the first polystyrene to the rubber polymer is kept below about 95:100 in the first reactor.

9. The process of claim 1 wherein from about 20 to about 60 weight percent of the second styrene monomer charge is polymerized in the second reactor to form polystyrene.

10. The process of claim 1 wherein a ratio of from about 25:75 to about 90:10 of effluent from the first reactor compared to the effluent from the second reactor are combined in the quiescent reaction zone.

11. An improved high-impact polystyrene made by the process of claim 1.

12. The improved high-impact polystyrene of claim 11 having from about 2 to about 15 parts by weight rubber polymer compared to polystyrene.

13. The improved high-impact polystyrene of claim 11 having from about 5 to about 9 parts by weight rubber polymer compared to polystyrene.

* * * * *